June 5, 1923.
W. ELLWOOD
1,457,510
AUTOMATIC FIRE SHUTTER FOR MOVING PICTURE MACHINES
Filed April 26, 1921
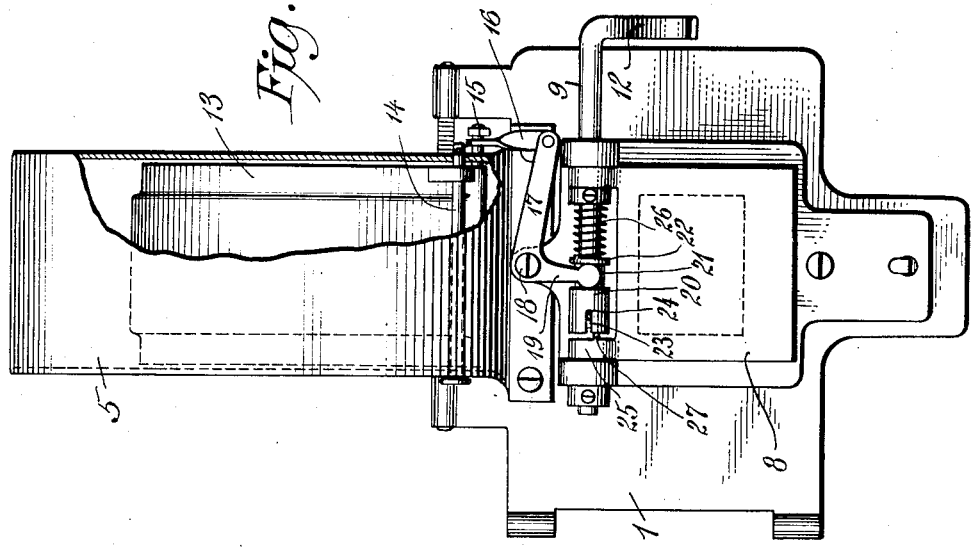
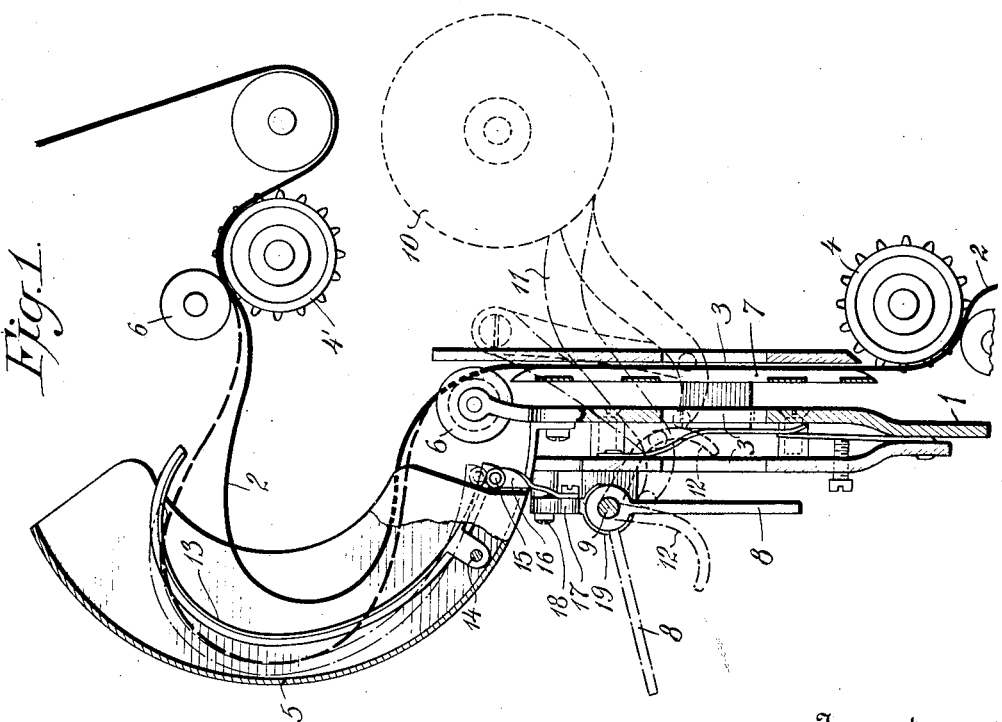
Inventor
William Ellwood
By his Attorneys
Pennie, Davis, Marvin & Edmonds

Patented June 5, 1923.

1,457,510

UNITED STATES PATENT OFFICE.

WILLIAM ELLWOOD, OF HEMPSTEAD, NEW YORK, ASSIGNOR TO NICHOLAS POWER COMPANY, INC., OF NEW YORK, N. Y., A CORPORATION OF DELAWARE.

AUTOMATIC FIRE SHUTTER FOR MOVING-PICTURE MACHINES.

Application filed April 26, 1921. Serial No. 464,591.

*To all whom it may concern:*

Be it known that I, WILLIAM ELLWOOD, a citizen of the United States, residing at Hempstead, in the county of Nassau, State of New York, have invented certain new and useful Improvements in Automatic Fire Shutters for Moving-Picture Machines; and I do hereby declare the following to be a full, clear, and exact description of the invention, such as will enable others skilled in the art to which it appertains to make and use the same.

The present invention relates to improvements in motion picture projectors.

Due to the inflammabilty of the material of motion picture films, it is necessary that specific precautions be taken to prevent direct rays from the projecting arc coming in contact with the film while stationary. It frequently happens during the showing of a picture that the film-driving mechanism fails, or that due to the perforations along its edges being torn out the movement of the film is stopped, although the driving mechanism still operates. Since a film will ignite very quickly when stationary if not shielded from the direct rays of the projector arc, the relief mechanism supplied must be dependable and rapid in action. Satisfactory means of protection have been devised in cases where the stopping of the film is due to failure of the driving mechanism, a centrifugal emergency device depending for its action upon the rotation of the driving mechanism being used, which type of device, however, does not provide a remedy in those cases where the film is stopped but the driving wheels still operate. A number of safety devices aiming to afford protection in such cases have been proposed, but at the present time have not appeared on the market in appreciable numbers because of certain inherent objections such as unreliability, complicated construction, separate additional mechanical parts, time required by the operator to restore normal conditions so that the showing of the picture may proceed, and the like.

The principal object of this invention is to provide a safety device of the above type which is simple in construction, has a small number of parts, and is mounted within the projector and as a part of it in otherwise unused space, not necessitating an increase in the dimensions of the projector or provision of a special housing.

A further object of the invention is to provide a device of the above type which is specially designed to be applied directly to projectors now in use, involving very little cost and a negligible amount of time for installation.

A still further object of the invention is to provide a device of the above type which, after it has been actuated by reason of a stoppage of the film, permits of immediate and speedy readjustment by the operator as soon as the film feed has been restored to normal so that the showing of the picture may continue with no perceptible interruption.

I have illustrated a preferred embodiment of my invention in the accompanying drawings, in which—

Figure 1 is a side vertical section of a motion picture projector equipped with my improvement; and Fig. 2 is an elevation of the projector with part of the hood broken away to better illustrate my improvement.

Referring to the drawings, the film 2 is unwound from a reel by means of sprocket wheel 4' and is drawn past the projecting apertures 3 by sprocket wheel 4, a slack loop being maintained within the hood 5 by the guide rollers 6 as shown, and the film kept smooth by the tension shoes 7 carried by the gate 1 as it passes the apertures 3. The light from the projector arc normally passes through the aperture 3 to the film 2, and thence on its way to the screen, but to cut off the light from the film when the machine is not in operation the swinging shutter 8 hinged to the shaft 9 is provided, the shutter normally hanging as shown to intercept the light from the projector arc before it reaches the film. When the machine is in operation the shutter is lifted to the position shown in dotted lines, in which case the light passes unhindered through the aperture to the film. The shutter is operated by a centrifugal governor 10 having an arm 11 for the purpose of engaging with an arm 12 which is rigidly attached to the shaft 9 and designed to lift the shutter when the driving mechanism is in operation.

The mechanism described above is in wide use at the present time in one make of machine, and some form of centrifugally-operated shutter of generally similar character is required by law on all machines used for public exhibitions.

My improvement comprises a lever arm 13 pivoted to the hood 5 by means of pivot pin 14, the upper portion of this lever arm being curved to receive the loop of slack maintained in the film 2. The lower end of the lever 13 is provided with a pin 15 which fits through a hole in the link 16, thus forming a hinged connection between the lever and the link. The member 13 is pivoted near its lower end thus making the upper lever arm much longer than the lower arm. The link 16 is pivotally connected to a bell crank lever 17 which is pivoted at 18 to the hood 5 and carries a fork 19 which is adapted to engage clutch 20. The clutch member 20 has a retaining shoulder 22 and a reduced portion 21, at which place it is engaged by the fork 19. It is secured to shaft 9 by means of a pin 23 fitting within the groove 24, thus allowing longitudinal movement but preventing rotation with respect to the shaft 9. The clutch 20 is normally held against the hinge 25 of the shutter 8 by means of the coil spring 26 surrounding shaft 9 and acting against the shoulder 22. The hinge 25 of the shutter is provided with a small tongue 27 adapted to enter the groove 24 and thereby lock the shutter to the shaft 9 so long as the clutch members are in engagement. The shutter will therefore be raised when the shaft 9 is turned to the "open" position and will remain in that position so long as the normal operation of the machine continues. When, however, the member 13 is shifted by the film the clutch 20 shall be moved longitudinally of the shaft, thereby withdrawing the tongue from the groove and allowing the shutter 8 to drop into the closed position shown.

In operation the shutter is normally in the open position when the film 2 is being drawn past the projector aperture. If, then, the sprocket wheel 4 reaches a portion of the film in which the perforations have been torn out, or if for other cause the motion of the film should be arrested while the driving sprockets are still operating, the slack loop of the film within the hood 5 will rapidly increase in size as additional length of film is fed over the sprocket wheel 4', causing the enlarged loop to press against the lever 13 with sufficient force to actuate the relief mechanism. The movement of the lever arm about the pivot 14 causes the lower end of the lever to be raised, thus elevating the link 16 and turning the member 17 about its pivot, causing the clutch 20 to slip along the shaft 9 against the action of the spring 26 and leaving the shutter free to drop into the closed position.

To restore normal conditions it is merely necessary for the operator to grasp the film at some point below the intermittent sprocket wheel 4 and pull the portion of the film containing the torn perforations past the wheel, and at the same time to raise the shutter with his free hand into the open position, whereupon the spring 26 presses the clutch 20 into engagement and the shutter is again held in operative position. The film then passes on and the picture proceeds with no appreciable interruption.

It very frequently happens that the feed of the film will pick up of its own accord after being interrupted at the aperture by defective sprocket holes or other fault. That is, the friction of the spocket will frequently advance the film sufficiently for the teeth to catch in the sprocket holes beyond the torn out holes which cause the delay before the operator readjusts the film at the intermittent sprocket. In such case the operator may immediately restore the picture to the screen by raising the shutter and holding it up while he readjusts the film at the upper continuous sprocket 4' to reduce the loop sufficiently to release the arm 13. Whatever the cause of the stoppage of the film at the aperture, the shutter will be actuated to cut off the light immediately and before the film can become ignited from the light rays, thus always safeguarding the machine against fire until the operator can find out and adjust the defect, whether trivial or serious.

To apply my improvement to picture projectors now in use only very slight changes in the structure are required. The clutch may be mounted upon the same shaft that carries the shutter in the old machine, it being merely necessary to hinge the shutter on the shaft and mount the pivoted levers and links on the projector frame.

I claim:

1. In a projector for motion pictures having a film-driving mechanism, the combination of a shaft, a shutter hinged to said shaft, a clutch slidably mounted on said shaft and adapted to hold the shutter normally in a raised position, and means actuated by the film for releasing the clutch from its engagement with said shutter whenever the motion of the film becomes arrested without simultaneous stopping of the driving mechanism, and permitting the shutter to drop into the closed position.

2. In a projector for motion pictures having a film-driving mechanism, the combination of a shaft, a shutter hinged to said shaft, a clutch slidably mounted on the shaft and adapted to hold the shutter normally in a raised position, a pivoted member for engaging said clutch, and a lever actuated by the film and connected to said pivoted member in such manner as to cause it to disengage said clutch from the shutter whenever the motion of the film becomes arrested without simultaneous stopping of the driving mechanism, thereby permitting the shutter to drop into the closed position.

3. In a projector for motion pictures comprising a film driving mechanism, a shaft provided on the body of the projector, a shutter hinged to said shaft and normally held in a raised position, means cooperating with the film for releasing the holding means for said shutter whenever the motion of said film becomes arrested without simultaneous stopping of the driving mechanism, thereby allowing the shutter to drop into closed position with the apparatus otherwise undisturbed, said shutter and its actuating mechanism being mounted directly upon the projector and as an essential part thereof.

In testimony whereof I affix my signature.

WILLIAM ELLWOOD.